US010926716B2

(12) United States Patent
Wuertemberger et al.

(10) Patent No.: US 10,926,716 B2
(45) Date of Patent: Feb. 23, 2021

(54) HOLDER FOR BACKUP CAMERA

(71) Applicant: Dr. Ing. h.c. F. Porsche Aktiengesellschaft, Stuttgart (DE)

(72) Inventors: Ralf Wuertemberger, Flein (DE); Thomas Weiss, Tamm (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/561,090

(22) Filed: Sep. 5, 2019

(65) Prior Publication Data
US 2020/0070739 A1 Mar. 5, 2020

(51) Int. Cl.
| H04N 7/18 | (2006.01) |
| B60R 11/04 | (2006.01) |
| B60R 19/02 | (2006.01) |
| H04N 5/225 | (2006.01) |
| B60R 19/18 | (2006.01) |

(52) U.S. Cl.
CPC ............ B60R 11/04 (2013.01); B60R 19/023 (2013.01); H04N 5/2252 (2013.01); B60R 2019/186 (2013.01); B60R 2300/806 (2013.01)

(58) Field of Classification Search
CPC ....................................... B60R 11/04
USPC ....................................... 348/148
See application file for complete search history.

(56) References Cited

U.S. PATENT DOCUMENTS

| 2006/0103727 A1* | 5/2006 | Tseng | B60R 1/00 |
| | | | 348/148 |
| 2012/0121876 A1* | 5/2012 | Milesi | C08L 83/04 |
| | | | 428/220 |
| 2013/0335624 A1* | 12/2013 | Barthel | H04N 5/2251 |
| | | | 348/373 |
| 2015/0360619 A1* | 12/2015 | Barthel | B60R 11/04 |
| | | | 348/148 |
| 2017/0129419 A1* | 5/2017 | Conger | H04N 5/2252 |
| 2018/0001837 A1* | 1/2018 | Trebouet | B08B 3/02 |
| 2018/0186341 A1* | 7/2018 | Kimura | B60S 1/56 |

FOREIGN PATENT DOCUMENTS

| DE | 10 2015 108 120 | 11/2016 |
| JP | 2005-022496 | 1/2005 |
| WO | 2016-109790 | 7/2016 |

OTHER PUBLICATIONS

German Search Report dated May 8, 2019.

* cited by examiner

Primary Examiner — Leron Beck
(74) Attorney, Agent, or Firm — Gerald E. Hespos; Michael J. Porco; Matthew T. Hespos

(57) ABSTRACT

A holder (10) for mounting a camera in a through-opening (12) in the region of a bumper (14) of a vehicle (16) has an outer part (18) that can be mounted on the bumper (14) from an outer face (20) of the bumper and an inner part (22) that can be mounted from an inner face (24) of the bumper (14). A receiving space (26) for receiving the camera is formed between the outer part (18) and the inner part (22) and the outer part (18) is designed for mounting the camera.

6 Claims, 4 Drawing Sheets

HOLDER FOR BACKUP CAMERA

CROSS REFERENCE TO RELATED APPLICATION

This application claims priority under 35 USC 119 to German Patent Appl. No. 10 2018 121 600.9 filed on Sep. 5, 2018, the entire disclosure of which is incorporated herein by reference.

BACKGROUND

Field of the Invention

The invention relates to a holder for mounting a camera in a through-opening in the region of a bumper of a vehicle. The invention further relates to a vehicle with a bumper, a holder and a camera.

Related Art

Various countries have regulations governing the fitting of vehicles with cameras, for example a backup camera for protecting people in particular in an area located behind the vehicle when reversing. In addition, regulations may apply to the protection of the camera in the event of an accident, and these regulations have to be taken into account in the mounting and design of the camera.

For example, the USA has a law FMVSS 111 concerning backup cameras and a further law US 49 CFR 518 (pendulum law) that specify corresponding requirements to be met by current vehicles. For example, it is necessary in the USA that the function of the camera in accordance with FMVSS 111 is guaranteed after testing with a pendulum on the basis of US 49 CFR 518. The camera and a region of installation of the camera therefore have to remain free of damage.

This is problematic, for example, if the backup camera is positioned in front of a bumper support and in the region of direct impact of pendulum and wall collision point. However, it can also be problematic if the backup camera is positioned above the bumper support, regardless of whether the backup camera is positioned in the region of direct or indirect impact of a pendulum or a wall collision point.

Cameras usually are protected by arranging the camera in a housing or holder that is mounted in the housing on the bumper. However, in many cases this is not enough to meet the stated legal requirements.

DE 10 2015 108 120 A1 discloses a method for producing a housing assembly of a camera of a motor vehicle. In the method, a front housing of the housing assembly is formed with an interior that has a receiving region for at least one circuit board of the camera. The front housing is made of a metallic material produced by powder metallurgy injection molding.

WO 2016/109790 A1 discloses a backup camera arrangement with a lens unit comprising a lens barrel, with a sensor lens arranged therein, and a light sensor unit. The light sensor has a printed circuit board with a light sensor chip mounted thereon. A rear housing supports a first face of the printed circuit board. A front housing is coupled to the rear housing and supports a second face of the printed circuit board. The front housing defines a lens holder, and the lens barrel is received in the lens holder of the rear housing so as to align with the light sensor.

Proceeding from the abovementioned prior art, the object of the invention is to provide a holder for mounting a camera in a through-opening in the region of a bumper of a vehicle, and also a vehicle with a bumper, a holder and a camera for permitting reliable and stable mounting of the camera on the bumper.

SUMMARY

The invention relates to a holder for mounting a camera in a through-opening in the region of a bumper of a vehicle. The holder has an outer part that can be mounted on the bumper from an outer face of the bumper, and an inner part that can be mounted from an inner face of the bumper. A receiving space is formed between the outer and inner parts that have been connected, and the receiving space can receive the camera. The outer part is designed for mounting the camera.

The invention also relates a vehicle with a bumper, a holder and a camera. The bumper has a through-opening. An outer part of the holder is mounted on the bumper from an outer face of the bumper. An inner part of the holder is mounted from an inner face of the bumper. The camera is mounted in a receiving space between the outer part and the inner part, and the camera is mounted on the outer part.

In certain embodiments of the invention the camera is mounted on the outer part on the bumper. More particularly, the camera may be mounted on the outer part from the inner face of the bumper. In this way, the camera can be reliably held in its position. Moreover, the camera can be mounted in a suitable position such to clearly observe a desired field of view. Moreover, the mounting on the outer part permits reliable and stable fitting of the camera on the bumper.

The holder functions to mount the camera in the through-opening so that the camera extends through the through-opening. The camera can be a backup camera.

The through-opening may be configured such that the camera with the holder is insertable therein. The through-opening thus has a shape adapted to the camera with the holder. The through-opening can be round or square, for example, and connects an inner face and an outer face of the bumper.

The bumper in certain embodiments is a rear bumper of the vehicle. The bumper is held on one or more bumper supports and usually is made of plastic or a composite material with a fiber fraction.

The outer part may be mounted on the bumper from the outer face of the bumper and forms a tight closure with the bumper. The inner part may be mounted from the inner face of the bumper. The camera is mounted in the receiving space.

The outer part may have first latch elements for latching in the through-opening. The first latch elements can comprise latching lugs that engage behind the through-opening of the bumper. This permits a simple latched mounting of the outer part on the bumper. The first latch elements may be mounted such that a tooling and mounting direction corresponds to the mounting of the camera with the holder. The first latch elements may be spaced apart at uniform intervals.

In an advantageous embodiment of the invention, the inner part has second latch elements for latching in the through-opening or with the outer part. The second latch elements can comprise latching lugs for example that engage behind the through-opening of the bumper. This permits a simple latched mounting of the inner part on the bumper or the outer part. The second latch elements may be mounted such that a tooling and mounting direction corresponds to the mounting of the camera with the holder. The second latch elements may be spaced apart at uniform intervals.

The inner part and the outer part may be designed to be fastened to each other by screwing. For example, fastening screws can be screwed through the inner part into a threaded portion of the outer part. The screw fastening permits particularly reliable mounting of the inner part on the outer part. The screw fastening can be combined with a latched mounting of the outer and/or inner part. In this way, for example, the camera with the holder can be mounted by latching, and then the holder and the camera can be fastened reliably by the screw mounting. The screw mounting may be effected from the inner face of the bumper, i.e. by the screws being screwed through the inner part into the threaded portions of the outer part. The screws are protected in this way and are exposed to the effects of weather only to a slight extent. The threaded portions function to fasten the screws. It is not necessary for a thread to be formed in the threaded portions of the outer part. Thus, a threaded nut can also be received as threaded portion in the outer part. Alternatively, the threaded portion has a small internal cross section, such that an outer thread of the fastening screws engages therein upon screwing and secures the inner part on the outer part.

The inner part and the outer part may be designed and arranged to clamp the bumper between them in the fastened state. The bumper is thus clamped in the manner of a sandwich between the inner part and the outer part. No means are needed beyond the through opening for fastening the holder with the camera to the bumper.

The inner part and the outer part of one embodiment are made of different materials. More particularly, the inner part may be stiffer and more impact-resistant than the outer part. Making the inner part and the outer part from materials with different properties permits stable retention of the camera via the stiffer and more impact-resistant inner part, and reliable sealing on the outer face of the bumper by the outer part, for example to prevent the entry of dirt and moisture. The less stiff outer part can adapt well to a contour of the bumper.

In an advantageous embodiment of the invention, the inner part is made of stiff and impact-resistant PA6-GF30-HI and the outer part is made of PA6-GF15 or PP-T20. PA6-GF30-HI is a polyamide 6 with 30% glass fiber, as a result of which it is particularly impact-resistant. PA6-GF15 is a polyamide 6 with a 15% glass fiber fraction, as a result of which it is less stiff than PA6-GF30-HI. In principle, IPYLENE PP T20 has similar properties, with less stiffness than PA6-GF30-HI.

The inner part may have a passage for the insertion of a plug for the electrical connection of the camera. The passage permits simple mounting of the camera. In the mounted state, connection of the camera can be performed on the bumper. The plug can be inserted into the passage to connect the camera electrically. In this way, the camera can be connected, for example, to a control appliance of the vehicle. In the connected state, cables are thus routed through the passage.

The inner part and the outer part may have an overlapping region that extends in the longitudinal direction along the camera. A double-walled housing of the holder is formed in the overlapping region. The camera thus is protected particularly reliably in the holder. The inner part of one embodiment engages around the outer part, particularly when the inner part is stiffer and more impact-resistant than the outer part. In this case, the inner part forms a stable protection for the camera, while the outer part allows a certain flexibility, for example under the effect of external forces.

Below, the invention is explained by way of example with reference to the appended drawings and on the basis of an illustrative embodiment. Each feature set out below may represent an aspect of the invention individually or in combination.

DETAILED DESCRIPTION

Figure 1:
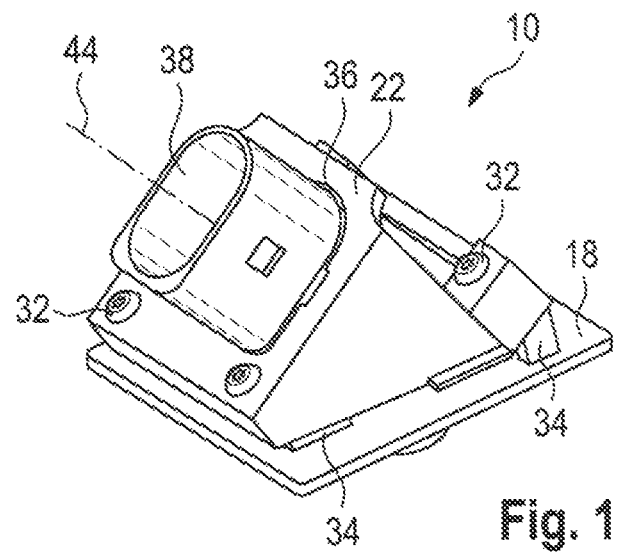
FIG. 1 is a perspective view of a holder for mounting a camera in a through-opening in the region of a bumper of a vehicle according to an embodiment of the invention.

FIG. 1 shows a holder 10 according to an embodiment of the invention.

The holder 10 serves for mounting a backup camera C in a through-opening 12 in the region of a bumper 14 of a vehicle 16, as is depicted in FIGS. 2 to 6, which show the holder 10 in the mounted state. The backup camera C thus extends through the through-opening 12. The through-opening 12 is configured so that the backup camera is insertable therein with the holder 10.

Figure 6:
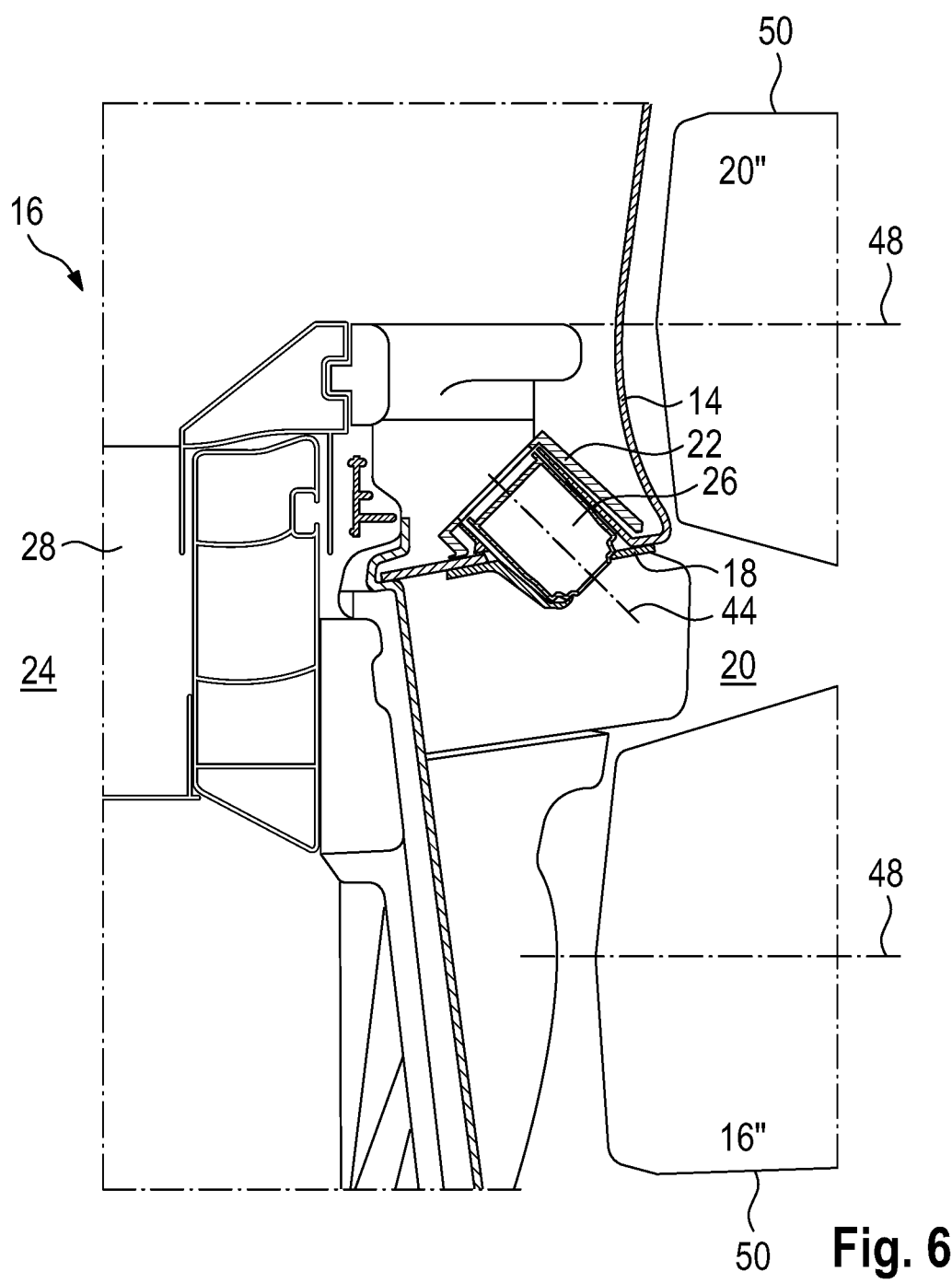
FIG. 6 is a sectional view in the transverse direction of the bumper of the vehicle with the holder from FIG. 1, having pendulums for carrying out a pendulum test, in accordance with the first embodiment.

In this illustrative embodiment, the bumper 14 is a rear bumper 14 of the vehicle 16. The bumper 14 is held on one or more bumper supports 28, as is shown in FIG. 6, and is made of plastic or of a composite material with a fiber fraction.

Figure 2:
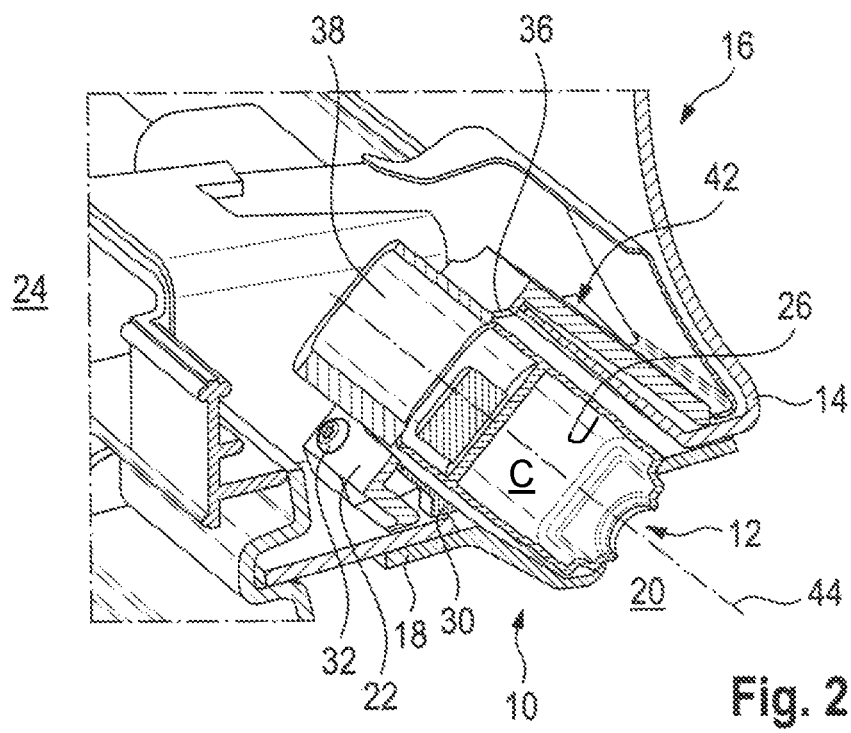
FIG. 2 is a sectional view of the holder from FIG. 1, in a state when mounted in the through-opening in the region of the bumper of the vehicle.
Figure 3:
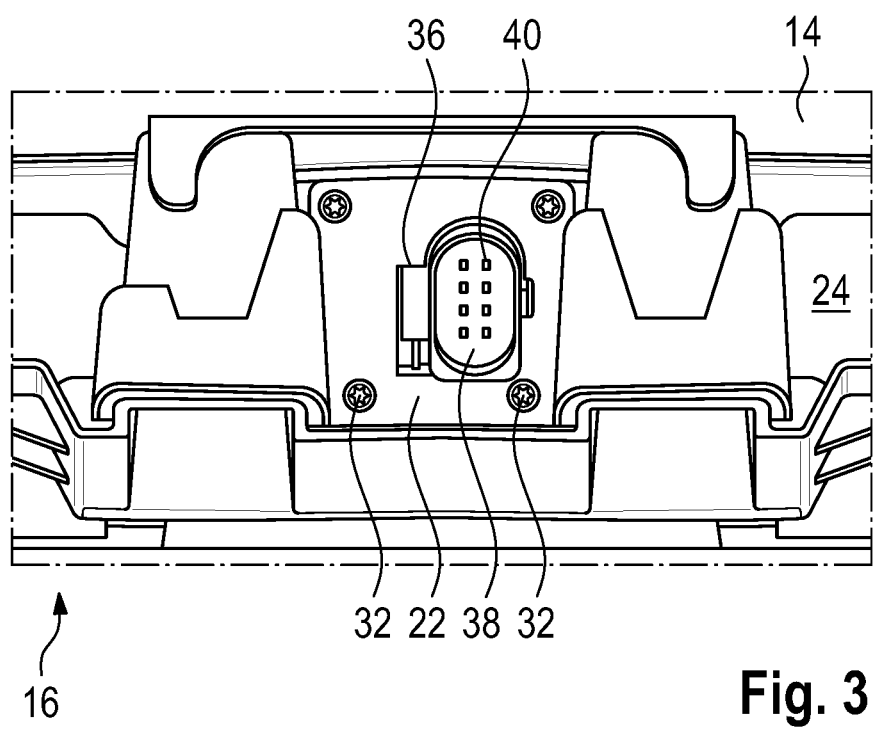
FIG. 3 is a rear view of the holder from FIG. 1, in the state according to FIG. 2 when mounted in the through-opening in the region of the bumper of the vehicle.

The holder 10 comprises an outer part 18 that can be mounted on the bumper 14 from an outer face 20 of the bumper, and an inner part 22 that can be mounted from an inner face 24 of the bumper 14. A receiving space 26 for receiving the backup camera C is formed between the outer part 18 and the inner part 22 in the connected state, as is shown in FIG. 2 for example. The outer part 18 is configured for mounting the backup camera. The backup camera C is mounted on the outer part 18 from the inner face 24 of the bumper 14.

The inner part 22 and the outer part 18 are made of different materials. More particularly, the inner part 22 is stiffer and more impact-resistant than the outer part 18. Accordingly, the inner part 22 is made of stiff and impact-resistant PA6-GF30-HI, while the outer part 18 is made of PA6-GF15 or PP-T20.

As shown in FIG. 2, the outer part 18 has first latch elements 30 for latching in the through-opening 12. The first latch elements 30 are latching lugs that engage behind the through-opening 12 of the bumper 14.

The inner part 22 and the outer part 18 are configured to be fastened to each other by screwing. For this purpose, fastening screws 32 are screwed through the inner part 22 into a threaded portion 34 of the outer part 18. The threaded portions 34 serve to fasten the fastening screws 32. During fastening of the inner part 22 to the outer part 18, the bumper 14 is clamped between them.

The inner part 22 has a passage 36 for insertion of a plug for the electrical connection of the backup camera C. The plug is inserted into a plug socket 38 to contact electrical contacts 40 of the plug socket 38, as can best be seen from FIG. 3.

The inner part 22 and the outer part 18 have an overlapping region 42 that extends in the longitudinal direction 44 along the backup camera C. A double-walled housing of the holder 10 is formed in the overlapping region with the inner part 22 engaging around the outer part 18.

Figure 4:
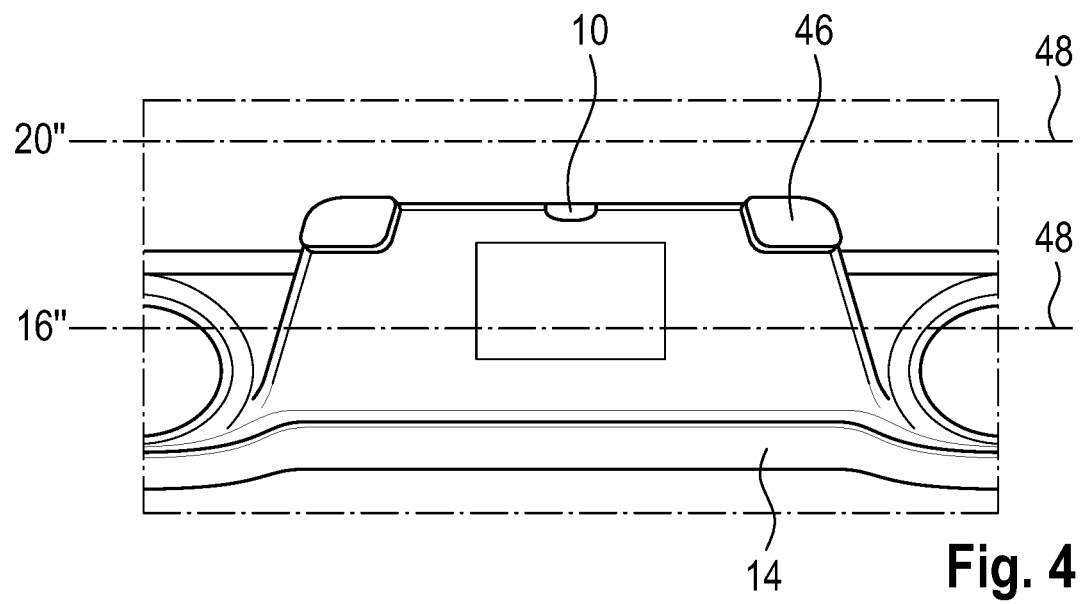
FIG. 4 is a sectional view in the longitudinal direction of the bumper of the vehicle with the holder from FIG. 1.
Figure 5:
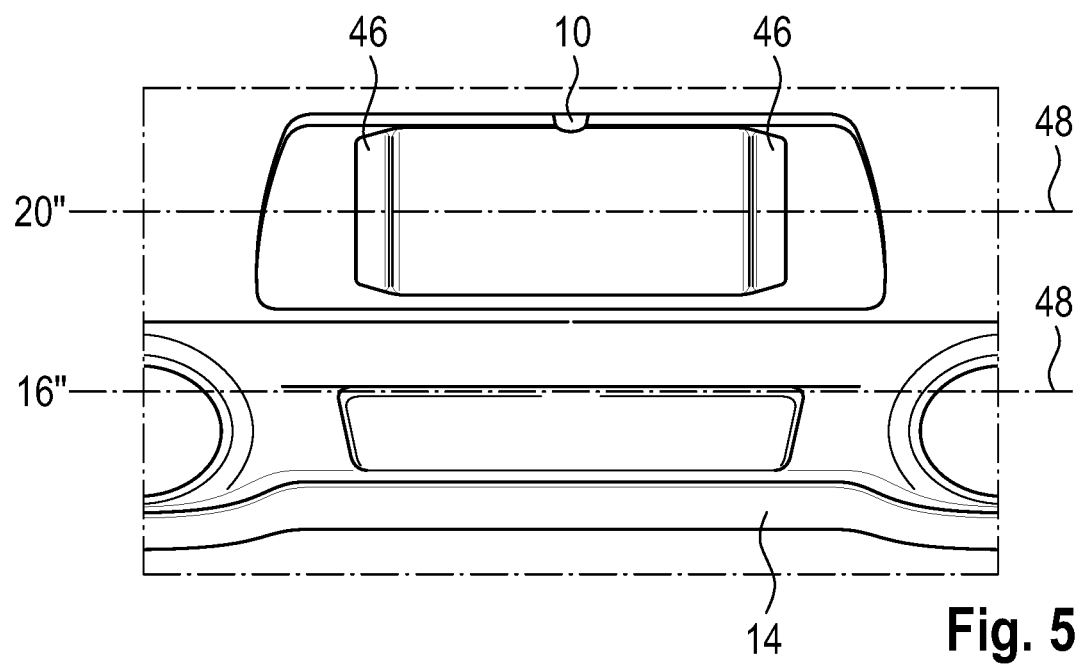
FIG. 5 is a plan view of the bumper of the vehicle with the holder of FIG. 1.

FIGS. 4 to 6 show the bumper 14 with the holder 10, including an attachment part 46 that is mounted on the bumper 14 in the region of the holder 10 with the backup camera. FIGS. 4 to 6 also show impact lines 48 of a pendulum 50 for carrying out pendulum tests. An impact region of the pendulum 50 is defined between the impact lines 48.

LIST OF REFERENCE SIGNS 10 holder
12 through-opening
14 bumper
16 vehicle
18 outer part
20 outer face
22 inner part
24 inner face
26 receiving space
28 bumper support
30 latch element, latching lug
32 fastening screw
34 threaded portion
36 passage
38 plug socket
40 electrical contact
42 overlapping region
44 longitudinal direction
46 attachment part
48 impact line
50 pendulum

What is claimed is:

1. A holder for mounting a camera in a through-opening in the region of a bumper of a vehicle, with
   an outer part configured to be mounted on the bumper from an outer face of the bumper, the outer part including a region sealed against the outer face of the bumper adjacent the through-opening in the bumper and first latch elements engaging areas of an inner face of the bumper adjacent the through-opening; and
   an inner part configured to be mounted from the inner face of the bumper and engaged against the inner face of the bumper, the inner part including second latch elements engaged with the outer part so that the bumper is clamped between the inner and outer parts with the inner and outer parts at least partly overlapping one another along a longitudinal mounting direction of the camera in the through-opening in the bumper, wherein
   a receiving space for receiving the camera is formed between the outer part and the inner part in the connected state and the outer part is configured for mounting the camera.

2. The holder of claim 1, wherein the inner part and the outer part are configured to be fastened to each other by fastening screws screwed through the inner part into a threaded portion of the outer part.

3. The holder of claim 1, wherein the inner part and the outer part are made of different materials so that the inner part is stiffer and more impact-resistant than the outer part.

4. A holder for mounting a camera in a through-opening in the region of a bumper of a vehicle, comprising:
   an outer part configured to be mounted on the bumper from an outer face of the bumper; and
   an inner part configured to be mounted from an inner face of the bumper, wherein:
   a receiving space for receiving the camera is formed between the outer part and the inner part in the connected state and the outer part is configured for mounting the camera; and
   the inner part is made of stiff and impact-resistant PA6-GF30-HI and the outer part is made of PA6-GF15 or PP-T20.

5. The holder of claim 1, wherein the inner part has a passage for insertion of a plug for electrical connection of the camera.

6. A vehicle comprising: a bumper, a holder and a camera, wherein
   the bumper has a through-opening,
   the holder has an outer part mounted on the bumper from an outer face of the bumper, the outer part including a region sealed against the outer face of the bumper adjacent the through-opening in the bumper and first latch elements engaging areas of an inner face of the bumper adjacent the through-opening;
   the holder further has an inner part mounted from an inner face of the bumper and engaged against the inner face of the bumper, the inner part including second latch elements engaged with the outer part so that the bumper is clamped between the inner and outer parts with the inner and outer parts at least partly overlapping one another along a longitudinal mounting direction of the camera in the through-opening in the bumper, the outer part and the inner part being made of different materials so that the inner part is stiffer and more impact-resistant than the outer part, and
   the camera is mounted in a receiving space between the outer part and the inner part, wherein the camera is mounted on the outer part.

* * * * *